Aug. 5, 1924.
N. GRILICH
FLOAT VALVE
Filed Aug. 3, 1921
1,503,686
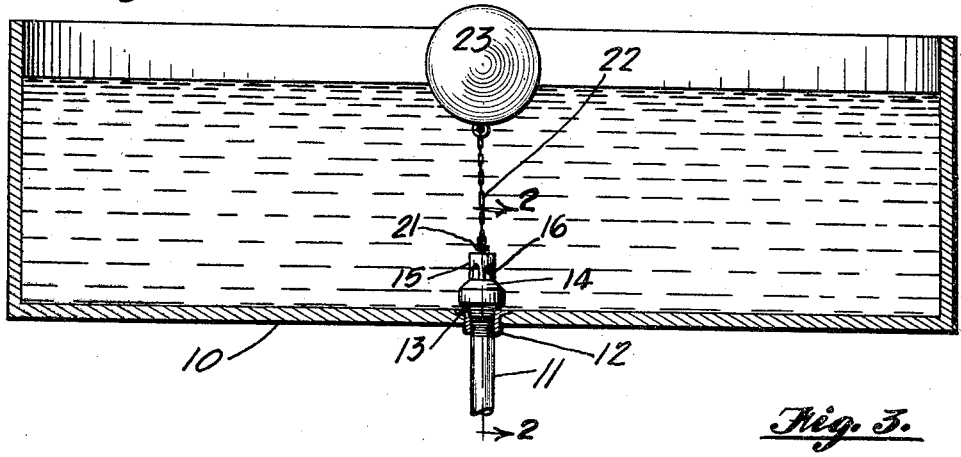
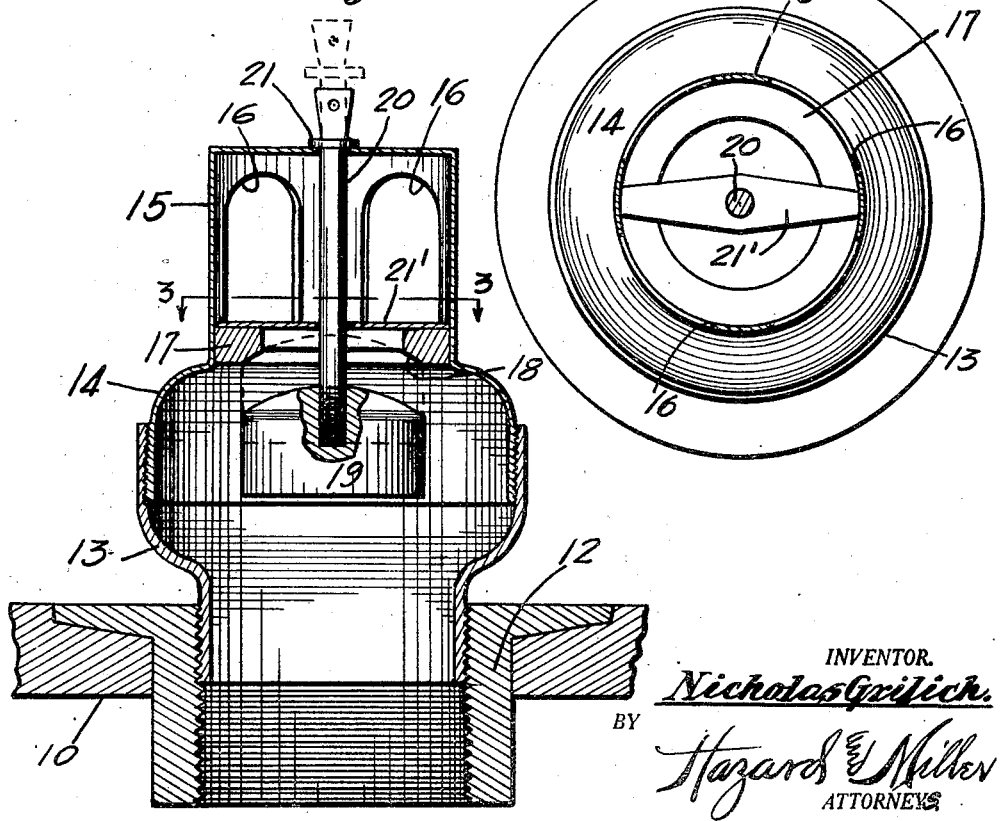
INVENTOR.
Nicholas Grilich.
BY
Hazard & Miller
ATTORNEYS Patented Aug. 5, 1924.

1,503,686

UNITED STATES PATENT OFFICE.

NICHOLAS GRILICH, OF LOS ANGELES, CALIFORNIA, ASSIGNOR OF ONE-HALF TO HENRY E. FLETCHER, OF GILA BEND, ARIZONA.

FLOAT VALVE.

Application filed August 3, 1921. Serial No. 489,422.

*To all whom it may concern:*

Be it known that I, NICHOLAS GRILICH, a citizen of the United States, residing at Los Angeles, in the county of Los Angeles and State of California, have invented new and useful Improvements in Float Valves, of which the following is a specification.

My invention relates to a float valve of the type utilized for controlling the inlet of water to stock water troughs or tanks; and principal objects of my invention being to generally improve upon and simplify the construction of the existing types of float valves, to provide a relatively simple and practical form of valve that is governed in its opening and closing movements by the height or level of the body of water within the tank or trough, and further to provide a fluid control valve that cannot be accidently opened or closed by stock that drink from the trough or tank with which the valve is associated.

A further object of my invention is to construct and locate the valve so as to make it practically impossible for persons to obtain water direct from the pipe leading to the trough or tank with which the valve is associated.

With the foregoing and other objects in view, my invention consists in certain novel features of construction and arrangement of parts that will be hereinafter more fully described and claimed and illustrated in the accompanying drawings, in which:

Figure 1 is a vertical section taken through the central portion of a trough or tank, and showing a float valve of my improved construction applied thereto.

Fig. 2 is an enlarged vertical section taken approximately on the line 2—2 of Fig. 1.

Fig. 3 is a horizontal section taken on the line 3—3 of Fig. 2.

Referring by numerals to the accompanying drawings which illustrate a practical embodiment of my invention, 10 designates a tank or watering trough, and leading thereto from a suitable source of water supply is an inlet pipe 11. I prefer to connect this supply pipe to a central portion of the bottom of the tank or trough, and to this end, a suitable coupling or internally threaded nipple 12 is seated in the bottom of the trough structure at a point near the center thereof and to which nipple pipe 11 is directly connected.

Screw seated in the upper end of the nipple 12 is the lower end of a bowl-shaped member 13, the upper portion of which is internally threaded, and screw seated therein is the bell-shaped lower portion 14 of a guide cap 15, and which latter is provided with a series of apertures 16. Arranged within the cap 15 just above the bell-shaped lower portion 14 is a ring 17, the inner lower edge of which is beveled to form a valve seat 18, and adapted to rest upon said valve seat is the rounded upper edge of a disc valve 19. Secured to the center of this valve is the lower end of a guide stem 20 that projects upwardly through a bearing that is formed in the center of a cross bar 21', and which latter is positioned immediately above the ring 17, and the upper portion of said stem 20 projects through the top of cap 15 so that the apertures in 15 and 21' guide the stem 20. That portion of the stem above the top of the cap is provided with a flange 21 that performs the functions of a stop to limit the downward movement of the valve stem, and secured to the upper end of guide stem 20 is the lower end of a flexible member 22, preferably a chain, and the upper end of which is connected to a buoyant member 23, preferably a hollow metal sphere.

The operation of my improved float valve is entirely automatic, and as will be understood, when the level of the body of water within the trough or tank drops below a certain horizontal plane, the valve 19, under the action of gravity, will leave the seat 18 thereby permitting water from the supply pipe 11 to flow upwardly through the opened valve, and when the normal or predetermined level of water has been established in the tank or trough, the elevation of the float 23 will draw the valve 19 against its seat thereby cutting off the further increase of water by closing said valve.

The position of the buoyant member or float 23 at or near the center of the tank is such that it cannot be struck or injured by the stock that drink from the trough or tank, and the locating of the inlet valve in the bottom of the tank will prevent unauthorized persons from drawing fresh water from the inlet pipe, for as valve 19 is opened, the fresh water entering the tank from the supply pipe is delivered directly into the body of water contained within the tank and the latter is more or less contaminated by the animals drinking therefrom.

A float valve of my improved construction is comparatively simple, may be easily and cheaply produced, is entirely automatic in its operations, and is very effective in performing its intended functions.

It will be understood that minor changes in size, form and construction of the various parts of my improved float valve may be made and substituted for those herein shown and described without departing from the spirit of my invention, the scope of which is set forth in the appended claim.

I claim as my invention:

A float valve construction comprising the combination with a watering trough having a central opening, of an internally threaded nipple mounted in the central opening, a supply pipe connected to the nipple, a bowl-shaped member screwed down into the nipple and having an open internally threaded upper end, a bell-shaped cap screwed into the upper end of the bowl-shaped member and having a straight upper portion with side openings, a valve seat mounted in the lower part of the straight portion below the openings, a disk valve adapted to fit the valve seat, a solid stem connected to the disk valve and extending upwardly through a bearing above the valve seat and through a second bearing above the openings, a flexible member connected to the upper end of the stem, a float connected to the upper end of the flexible member, and a flange upon the upper end of the stem above the bearings to limit the downward movement of the valve.

In testimony whereof I have signed my name to this specification.

NICHOLAS GRILICH.